June 6, 1939.  S. PAPP  2,161,722
PARACHUTE ATTACHMENT FOR AIRPLANES
Filed July 25, 1938  2 Sheets-Sheet 1
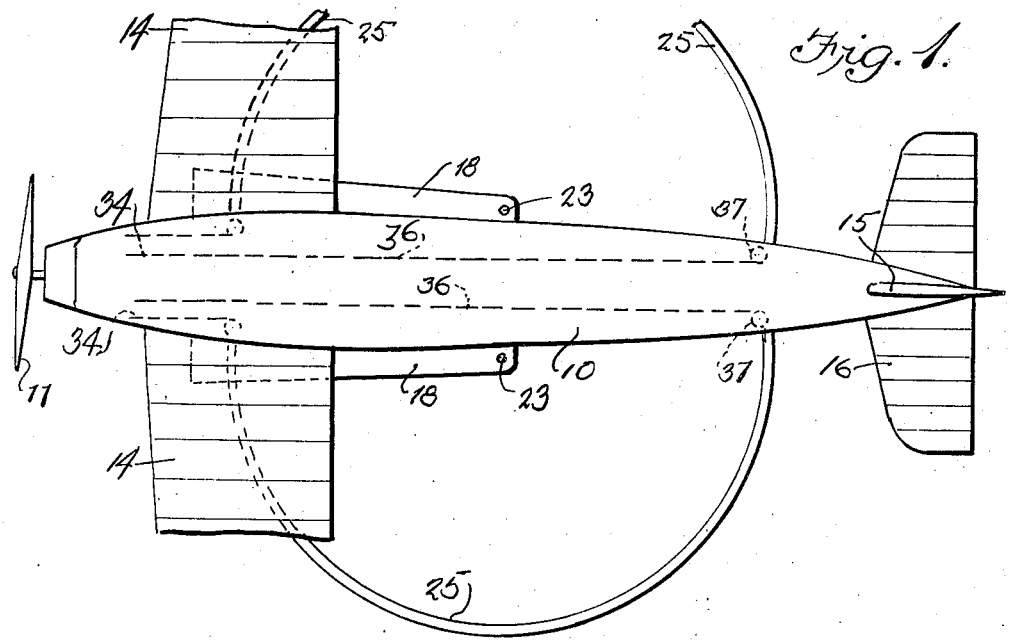
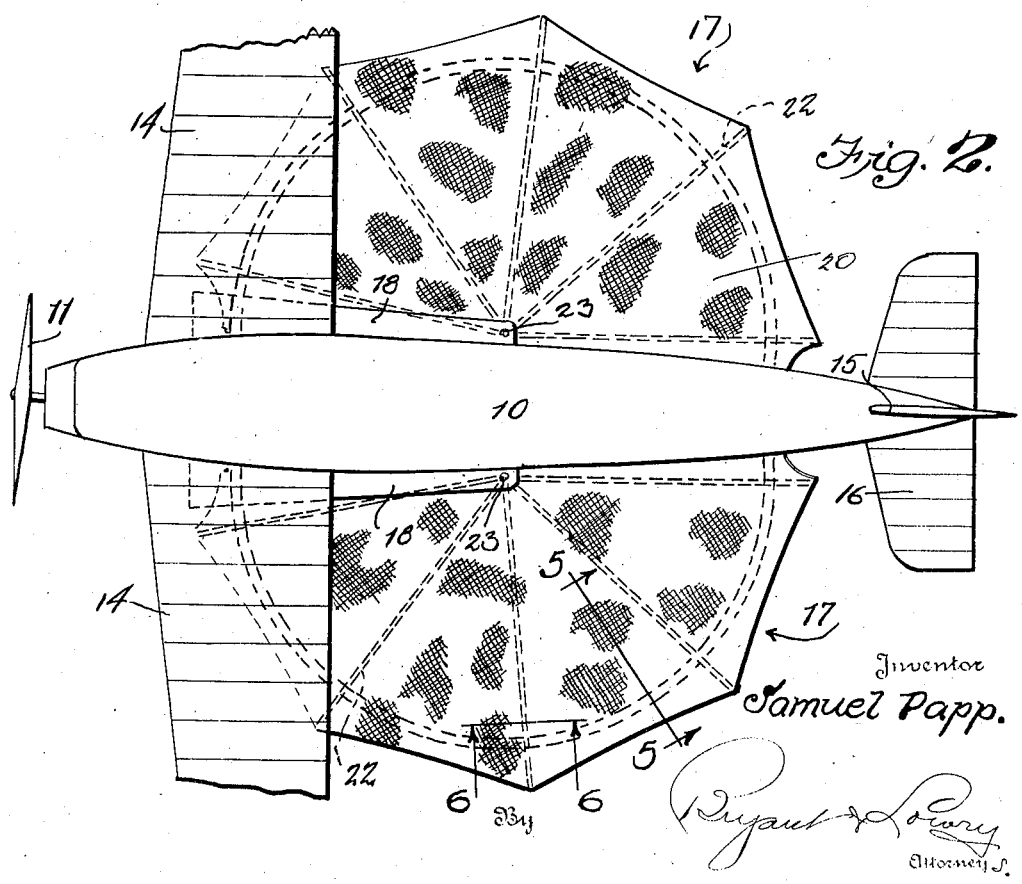
Inventor
Samuel Papp.
Bryant & Lowry
Attorneys

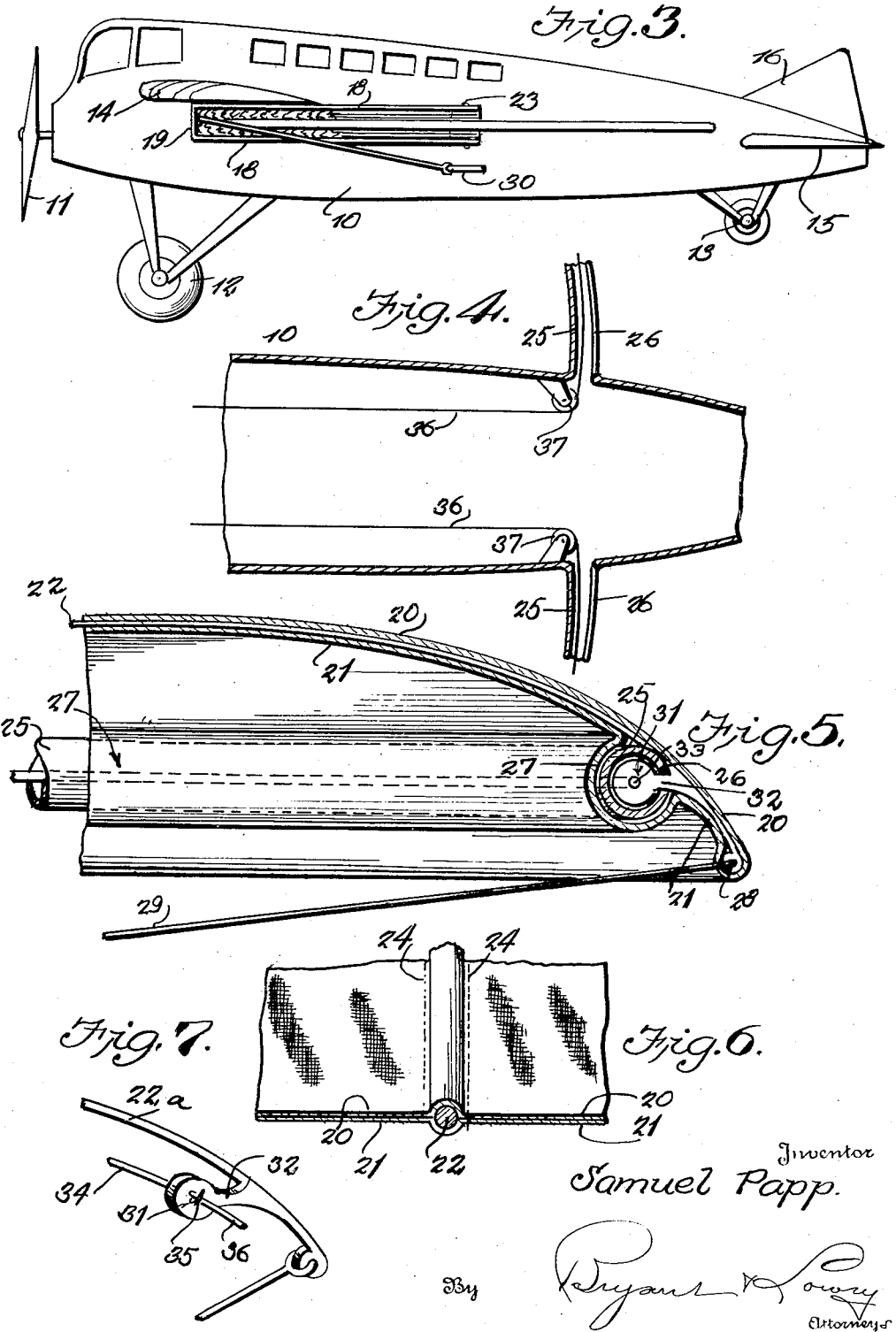

Patented June 6, 1939

2,161,722

UNITED STATES PATENT OFFICE 2,161,722

PARACHUTE ATTACHMENT FOR AIRPLANES

Samuel Papp, Lowellville, Ohio

Application July 25, 1938, Serial No. 221,210

4 Claims. (Cl. 244—139)

This invention relates to certain new and useful improvements in parachute attachment for airplanes.

The primary object of the invention is to provide a parachute attachment for airplanes wherein the parachute that is of the umbrella type embodying radial ribs for the support of a canvas is formed of substantially semi-circular sections respectively disposed at opposite sides of the fuselage with the side sections adapted to be folded into inoperative positions in forward directions for confinement within a hood at each side of the fuselage.

A further object of the invention is to provide a parachute attachment for airplanes of the foregoing character wherein the radial ribs for the support of the parachute canvas are pivoted at a focal point at opposite sides of the fuselage with a lug at the outer end of each rib movable in an arcuate guide carried by the fuselage with cords or cables manually operable from within the fuselage for moving the parachute into its open and closed positions.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a fragmentary top plan view of an airplane equipped with the parachute attachment forming the present invention, with the sectional parachute in its closed inoperative position and located in relatively narrow housings at each side of the fuselage;

Figure 2 is a fragmentary top plan view showing the parachute extended to its fully opened position;

Figure 3 is a side elevational view of the airplane showing the parachute in its closed inoperative position with the side sections confined within a housing carried by the fuselage;

Figure 4 is a fragmentary longitudinal sectional view showing operating cords manually operable within the fuselage and extending through oppositely disposed guide tubes for the operation of the parachute;

Figure 5 is a detail sectional view taken on line 5—5 of Figure 2, showing a lug carried by one of the upper parachute ribs, slidable in an arcuate guide for the parachute;

Figure 6 is a detail sectional view taken on line 6—6 of Figure 2, showing the two-ply parachute canvas secured to a radial supporting rib for the canvas; and Figure 7 is a fragmentary perspective view of the outer end rib of a parachute section, with the operating cord attached to the lug of the rib for moving the rib and parachute section into open and closed positions.

Referring more in detail to the accompanying drawings, the reference character 10 designates the fuselage of the airplane equipped with the usual forwardly positioned propeller 11, front and rear landing gears 12 and 13 respectively, lateral wings 14, rearwardly positioned elevators 15 and a rudder 16.

The parachute attachment for the airplane is formed of two substantially semi-circular sections of the umbrella type respectively positioned at opposite sides of the fuselage 10 with the forward sides of the parachute sections disposed beneath the wings 14 and normally confined when out of use in folded positions within side housings carried by the fuselage 10 which comprise relatively narrow top and bottom walls 18, and a front wall 19 while the outer side and rear end of each housing is open for the free movement and reception of the adjacent parachute sections 17. Each section 17 of the parachute is formed by two-ply canvas comprising top and bottom walls 20 and 21 respectively with radial supporting ribs 22 therefor that are pivotally mounted at their inner focal ends on a vertical pivot pin 23 extending between the upper and lower walls 18 of the side housing at the rear ends thereof, the housing and ribs being of relative lengths whereby said ribs with the canvas parachute carried thereby will be received within the housing when the parachute section is in its folded inoperative position. The ribs 22 are held immovable relative to the top and bottom walls 20 and 21 of the parachute canvas by stitching said walls 20 and 21 together at opposite sides of said ribs as shown at 24 in Figure 6.

A substantially semi-circular guide tube 25 is carried by each side of the fuselage 10 in the plane thereof and centers on the pivot pin 23 for the radial ribs 22, the open ends of the guide tubes 25 being in communication with the interior of the fuselage 10, while said guide tubes are slotted at their outer sides as shown at 26 in Figures 4 and 5. A loop or fold 27 is formed in the bottom wall 21 of the airplane canvas to enclose the guide tube 25, while the ribs 22 extend outwardly of and below said guide tube with the outer terminal end 28 of each rib having a brace rod connection 29 with the fuselage 10 at a point below the pivot 23 for the ribs 22, the inner ends of the several brace rods 29 that are respectively associated with the outer ends of the ribs 22 being connected as at 30 as shown in Figure 3 to the fuselage 10. The brace rods 29 prevent upward swinging movement of the outer ends of the parachute ribs 22.

Each parachute rib 22 carries a disk lug 31 at the inner side thereof in line with the guide tube 25 and is connected to said rib by a reduced neck 32, the disk lug being freely slidable in the guide tube 25, while the reduced neck is movable through the slotted opening 26 in said guide tube. Each disk lug has a central opening 33 therein.

A pair of operating cords is provided for each parachute section 17 and as shown in Figure 7, the lug 31 carried by the end rib 22a of the rear swinging end of the parachute section 17 has a forwardly directed pull cord 34 passed through the central opening 33 in the disk lug 31 and anchored thereto as at 35, the rearwardly positioned pull cord 36 being similarly anchored to said disk lug 31 carried by the end rib 22a. The pull cord 34 freely passes through the guide tube 25 and also freely passes through the openings 33 in the other disk lugs 31 carried by the several radial ribs 22, the pull cords 34 and 36 passing over guide pulleys 37 within the fuselage 10 adjacent the connected ends of the guide tubes 25 with the terminal ends of said operating cords 34 and 36 suitably anchored or held in adjusted position.

When the parachute sections are in the closed positions shown in Figs. 1 and 3, each section is confined within the side housing carried by the fuselage 10 to offer the least resistance to the travel of the airplane and said parachute sections are retained in their inoperative housed positions by anchoring the forwardly positioned operating cords 34. When it is desired to extend the parachute sections 17 to their operative positions as shown in Figure 2, the anchored ends of both cords 34 and 36 are released and a pull exerted on the cord 36 which first moves the end rib and parachute section carried thereby outwardly of the housing to stretch the parachute canvas between the first and second ribs and a continued pull on said operating cord 36 successively moves all of the ribs out of the housing for the full expansion of the parachute sections and when the same assumes the position shown in Figure 2, the inner end of the operating cord 36 is suitably anchored for holding the parachute in its extended position. The parachute sections are moved to their closed positions by a pull on the forwardly positioned cords 34.

The forward side of each parachute section 17 is suitably anchored to the bottom wall of the housing while the rear side of the parachute section is movable into position adjacent the rear end of the fuselage 10 to insure a complete parachute support for the airplane.

While there is herein shown and described the preferred embodiment of the invention, it is nevertheless to be understood that minor changes may be made therein without departing from the spirit and scope of the invention as claimed.

I claim:

1. In a parachute attachment for airplanes, in combination, a fuselage, an arcuate guide tube at each side of the fuselage in the plane thereof and slotted at its outer side, an arcuate parachute section at each side of the fuselage comprising a parachute canvas and radial ribs with the inner focal ends of the ribs pivoted to the fuselage, lugs carried by the ribs and slidable in the guide tube and operating cords associated with the rib lugs and movable through the guide tube for opening and closing the parachute section, and lower brace rods extending respectively between the outer ends of the ribs and the fuselage with the inner ends thereof focally pivoted to the fuselage below the pivotal mounting for the ribs, each rib lug having a reduced neck connection with its carrying rib with the neck slidable through the guide tube slot and the outer end of the ribs extending outwardly and downwardly of the guide tube for attachment to the brace rods.

2. In a parachute attachment for airplanes, in combination, a fuselage, an arcuate guide tube at each side of the fuselage in the plane thereof and slotted at its outer side, an arcuate parachute section at each side of the fuselage comprising a parachute canvas and radial ribs with the inner focal ends of the ribs pivoted to the fuselage, lugs carried by the ribs and slidable in the guide tube and operating cords associated with the rib lugs and movable through the guide tube for opening and closing the parachute section, and a relatively narrow housing at each side of the fuselage to receive the adjacent parachute section when in folded position, and lower brace rods extending respectively between the outer ends of the ribs and the fuselage with the inner ends thereof focally pivoted to the fuselage below the pivotal mounting for the ribs, each rib lug having a reduced neck connection with its carrying rib with the neck slidable through the guide tube slot and the outer end of the ribs extending outwardly and downwardly of the guide tube for attachment to the brace rods.

3. In a parachute attachment for airplanes, in combination, a fuselage, an arcuate guide tube at each side of the fuselage in the plane thereof and slotted at its outer side, an arcuate parachute section at each side of the fuselage comprising a parachute canvas and radial ribs with the inner focal ends of the ribs pivoted to the fuselage, lugs carried by the ribs and slidable in the guide tube and operating cords associated with the rib lugs and movable through the guide tube for opening and closing the parachute section, and lower brace rods extending respectively between the outer ends of the ribs and the fuselage with the inner ends thereof focally pivoted to the fuselage below the pivotal mounting for the ribs, each rib lug having a reduced neck connection with its carrying rib with the neck slidable through the guide tube slot and the outer end of the ribs extending outwardly and downwardly of the guide tube for attachment to the brace rods, the operating cords including a front and rear pull cord with adjacent ends of each cord secured to the lug carried by the outer rear rib and the front pull cord being slidable through the lugs carried by the other ribs.

4. In a parachute attachment for airplanes, in combination, a fuselage, an arcuate guide tube at each side of the fuselage in the plane thereof and slotted at its outer side, an arcuate parachute section at each side of the fuselage comprising a parachute canvas and radial ribs with the inner focal ends of the ribs pivoted to the fuselage, lugs carried by the ribs and slidable in the guide tube and operating cords associated with the rib lugs and movable through the guide tube for opening and closing the parachute section, and a relatively narrow housing at each side of the fuselage to receive the adjacent parachute section when in folded position, and lower brace rods extending respectively between the outer ends of the ribs and the fuselage with the inner ends thereof focally pivoted to the fuselage below the pivotal mounting for the ribs, each rib lug having a reduced neck connection with its carrying rib with the neck slidable through the guide tube slot and the outer end of the ribs extending outwardly and downwardly of the guide tube for attachment to the brace rods, the operating cords including a front and rear pull cord with adjacent ends of each cord secured to the lug carried by the outer rear rib and the front pull cord being slidable through the lugs carried by the other ribs.

SAMUEL PAPP.